US010451766B2

United States Patent
Xu et al.

(10) Patent No.: US 10,451,766 B2
(45) Date of Patent: Oct. 22, 2019

(54) METHODS OF ELEMENTAL IMAGING OF FORMATIONS AND SYSTEMS FOR PRODUCING THE SAME

(71) Applicant: Schlumberger Technology Corporation, Sugar Land, TX (US)

(72) Inventors: Libai Xu, Katy, TX (US); Wei Yang, Katy, TX (US); Jiaxin Wang, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/537,426

(22) PCT Filed: Dec. 17, 2015

(86) PCT No.: PCT/US2015/066531
§ 371 (c)(1),
(2) Date: Jun. 18, 2017

(87) PCT Pub. No.: WO2016/100755
PCT Pub. Date: Jun. 23, 2016

(65) Prior Publication Data
US 2018/0267199 A1    Sep. 20, 2018

Related U.S. Application Data

(60) Provisional application No. 62/094,789, filed on Dec. 19, 2014.

(51) Int. Cl.
*G01V 5/06* (2006.01)
*E21B 47/00* (2012.01)
(Continued)

(52) U.S. Cl.
CPC .......... *G01V 5/06* (2013.01); *E21B 47/0002* (2013.01); *E21B 47/12* (2013.01); *G01V 5/045* (2013.01); *G01V 5/12* (2013.01)

(58) Field of Classification Search
CPC . G01V 5/06; G01V 5/12; G01V 5/045; E21B 47/0002; E21B 47/12
(Continued)

(56) References Cited

U.S. PATENT DOCUMENTS 4,527,058 A * 7/1985 Smith, Jr. ............... G01V 5/06
                                                          250/256
4,786,796 A * 11/1988 Flaum .................... G01V 5/10
                                                          250/262

(Continued)

FOREIGN PATENT DOCUMENTS

WO      2014190244 A1   11/2014
WO   WO2014190244 A1   11/2014

OTHER PUBLICATIONS

International Search Report and Written Opinion issued in International Application PCT/US2015/066531 dated Mar. 18, 2016. 14 pages.

(Continued)

*Primary Examiner* — David P Porta
*Assistant Examiner* — Blake C Riddick

(57) ABSTRACT

Methods of elemental imaging of a formation include acquiring spectral gamma ray measurement, acquiring a total gamma ray image, deriving structure information of the formation from the total gamma ray image, and applying the structure information to the spectral gamma ray measurement to form an elemental image. In the present methods, the structure information of the formation is derived from comparing the total gamma ray logs for each azimuthal sector to a derived total gamma ray log. The derived total gamma ray log is acquired from the total gamma ray image (Continued)

by summing over all azimuth bins or the spectral gamma ray measurement by summing over all energy bins.

16 Claims, 9 Drawing Sheets

(51) Int. Cl.
    *E21B 47/12*     (2012.01)
    *G01V 5/04*     (2006.01)
    *G01V 5/12*     (2006.01)

(58) Field of Classification Search
    USPC .............................. 250/269.6, 256, 262, 261
    See application file for complete search history.

(56) References Cited

U.S. PATENT DOCUMENTS

| | | | | |
|---|---|---|---|---|
| 5,120,955 | A * | 6/1992 | Galford | G01V 5/06 250/256 |
| 6,766,855 | B2 * | 7/2004 | Snoga | E21B 47/026 166/254.1 |
| 7,880,134 | B2 | 2/2011 | Kirkwood et al. | |
| 8,049,164 | B2 | 11/2011 | Kirkwood et al. | |
| 8,190,369 | B2 | 5/2012 | Moos et al. | |
| 2005/0199794 | A1 | 9/2005 | Mickael | |
| 2006/0065824 | A1 * | 3/2006 | Mickael | E21B 47/0005 250/252.1 |
| 2006/0151697 | A1 * | 7/2006 | Inada | H01J 37/222 250/310 |
| 2008/0061225 | A1 * | 3/2008 | Orban | G01V 5/125 250/269.3 |
| 2009/0114806 | A1 * | 5/2009 | Kirkwood | G01V 5/101 250/269.6 |
| 2010/0201540 | A1 * | 8/2010 | Li | E21B 47/12 340/853.1 |
| 2011/0029246 | A1 * | 2/2011 | Nikitin | G01V 5/04 702/8 |
| 2011/0031015 | A1 * | 2/2011 | Downton | E21B 47/12 175/27 |
| 2012/0272724 | A1 | 11/2012 | Hollmann et al. | |
| 2013/0239673 | A1 * | 9/2013 | Garcia-Osuna | E21B 17/16 73/152.46 |
| 2013/0270011 | A1 * | 10/2013 | Akkurt | E21B 49/088 175/58 |
| 2013/0299687 | A1 * | 11/2013 | Scott | G01V 5/107 250/269.2 |
| 2014/0346336 | A1 * | 11/2014 | Huiszoon | G01V 5/08 250/265 |
| 2015/0098627 | A1 * | 4/2015 | Ye | G01V 1/50 382/109 |
| 2015/0131885 | A1 * | 5/2015 | Kim | G06T 5/002 382/132 |

OTHER PUBLICATIONS

Wheeler et al., The Introduction of an At-Bit Natural Gamma Ray Imagining Tool Reduces Risk Associated with Real-Time Geosteering Decisions in Coalbed Methane Horizontal Wells, SPWLA 53rd Annual Logging Symposium, Jun. 16-20, 2012, p. 1 through p. 6.
Maranuk et al., Applications of a unique spectral azimuthal gamma ray tool to unconventional reservoirs. SPWLA Annual Logging Symposium. Jun. 22-26, 2013. 15 pages.
Flook et al., At-bit Inclination, Gamma, and Imaging System Tracks Productive Zone in Complex Geology. Journal of Petroleum Technology. Mar. 2013. 3 pages.
"IPZIG at-bit Inclination and Natural Gamma Ray Service" Brochure from World Oil. Nov. 2014. p. A114.
Denney, Dennis "Wellbore in Zone." Journal of Petroleum Technology. May 2012. 1 page.

* cited by examiner

METHODS OF ELEMENTAL IMAGING OF FORMATIONS AND SYSTEMS FOR PRODUCING THE SAME

CROSS-REFERENCE TO RELATED APPLICATIONS

This patent application claims priority to U.S. Patent Application No. 62/094,789 filed Dec. 19, 2014, incorporated by reference herein in its entirety

BACKGROUND

A gamma ray tool can distinguish between shale and non-shale formations because of the differences in radioactivity between shale and sandstone/carbonate rock. The conventional gamma ray tool measures the number of gamma rays. The spectral gamma ray tool can measure the weight concentrations of potassium, uranium, and thorium in a formation. The azimuthal total gamma ray imaging tool can provide total gamma ray images while the tool is rotating and can associate the total gamma ray measurements with a tool face.

The azimuthal gamma ray imaging tool measures the level of total gamma ray activity of the formation as a function of tool face. This logging-while-drilling ("LWD") tool can provide high-resolution gamma ray images that identify and define the formation dips, faults and fractures along the horizontal section, even in light of local structural undulations, variations in target zone thickness and lateral property changes along the horizontal section. While the azimuthal gamma ray imaging tool is rotating, an image is formed by stacking the azimuthal gamma measurements along the measured depth.

To make an azimuthally sensitive measurement, however, gamma rays are shielded from the tool. This conflicts with the objective of collecting as many gamma rays as possible to make a precise spectral gamma ray measurement. The precision of spectral gamma ray measurement is then typically poorer than that of a total gamma ray log because only a small portion of gamma rays can be used to infer formation potassium, uranium, and thorium. In addition, generally, to make spectral gamma ray measurement, larger detectors, bigger in size, are used in comparison to gamma ray imaging. Therefore, the space that shielding occupies in gamma ray imaging tool could be used to mount a large detector to improve detection efficiency.

A need exists, therefore, for systems and methods that can measure gamma rays without the tool or detector to being collimated and/or shielded in order to make azimuthally sensitive elemental measurements.

SUMMARY

Provided here are methods of elemental imaging of a formation. The methods include (a) acquiring a spectral gamma ray measurement; (b) acquiring a total gamma ray image; (c) deriving structure information of the formation from the total gamma ray image; and (d) applying the structure information to the spectral gamma ray measurement to form an elemental image. The total gamma ray image provides a series of total gamma ray logs for each azimuthal sector. The structure information of the formation is derived from comparing the total gamma ray logs for each azimuthal sector to a derived total gamma ray log. The derived total gamma ray log is acquired from the total gamma ray image by summing over all azimuth bins or the spectral gamma ray measurement by summing over all energy bins.

Also, the methods provided herein can include deriving a depth shift relative to the total gamma ray log. The total gamma ray logs of each sector are compared to the derived total gamma ray logs to obtain a depth-shift map. When the depth-shift map is applied to the spectral gamma ray measurement, an elemental image is produced. The spectral gamma ray measurement can be made for each of formation potassium, uranium, or thorium. The spectral gamma ray measurement includes an elemental measurement and the total gamma ray logs.

The present methods can further include applying a 2-D alpha filter to the spectral gamma ray measurement to form an image of each element. The 2-D alpha filter is the difference between the total gamma ray image and the reconstructed total gamma ray image taken from the derived total gamma ray log. Also, an adjusted measured depth is calculated for each pixel of the total gamma ray image and a total gamma value for each said pixel of the total gamma ray image is replaced by the spectral gamma ray measurement to generate the elemental image. The total gamma value of each pixel can be replaced by spectral gamma measurement made at the same adjusted measured depth to build elemental images. The methods can also include deriving dip angles from the derived total gamma ray image.

Also provided herein are systems for producing elemental images. Such a system may include a spectral gamma ray tool, wherein the spectral gamma ray tool measures concentrations of potassium, uranium, and thorium in a formation as a function of measured depth to acquire spectral gamma ray measurement; and an azimuthal gamma ray imaging tool acquiring a total gamma ray image that includes at least one azimuthal sector. Structure information of the formation may be derived from the total gamma ray image for each said azimuthal sector, and the structure information may be applied to the spectral gamma ray measurement to form an elemental image.

Further presented herein are systems for real-time geosteering. Such a system may include a spectral gamma ray tool and an azimuthal gamma ray imaging tool. The spectral gamma ray tool can be configured to acquire the spectral gamma ray measurement and the azimuthal gamma ray imaging tool can be configured to acquire a total gamma ray image. The total gamma ray image may include at least one azimuthal sector. The total gamma ray image may be reduced to a series of derived total gamma ray logs for each said azimuthal sector. The derived total gamma ray logs and the spectral gamma ray measurement are first generated from a pilot well to build a strata model of formation without information about dipping angles. The total gamma ray image is acquired while drilling and transmitted to the Earth's surface to update the strata model with dipping angles and in order to generate elemental images in real-time.

BRIEF DESCRIPTION OF THE DRAWINGS

The above and further advantages of this disclosure may be better understood by referring to the following description in conjunction with the accompanying drawings, in which like numerals indicate like structural elements and/or features in various figures. The drawings are not necessarily to scale, emphasis instead being placed upon illustrating the principles of the disclosure.

DETAILED DESCRIPTION

Figure 1:
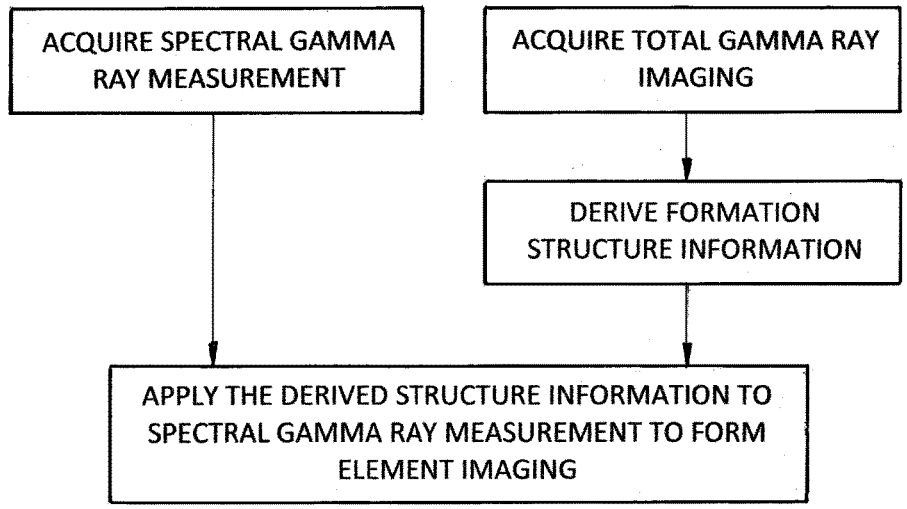
FIG. 1 is a flow chart of the general methodologies described herein.

The present disclosure relates to methods and systems for elemental imaging of formations of potassium, uranium, and thorium. More specifically, the present disclosure relates to methods of combining spectral gamma ray measurement with those of azimuthal total gamma ray imaging for elemental imaging of formations, and systems for producing the same.

Gamma ray logging is a technique used in oil and gas industry to measure naturally occurring gamma radiation in order to characterize the rock or sediment in and around a borehole. Naturally occurring gamma rays are emitted primarily from three elements: potassium, uranium, and thorium together with associated decay products in rock formations. Different types of rock emit different amounts of natural gamma radiation. For example, shale often emits more gamma rays than other sedimentary rocks because clay commonly contains radioactive potassium and the cation exchange capacity of clay causes uranium and thorium to be absorbed.

Three elements, potassium, thorium and uranium and their associated decay chains are typically responsible for the radiation emitted by rock. Shale often contains potassium as part of its clay content, and tends to absorb uranium and thorium as well. A total gamma ray log records the total radiation and does not distinguish between the radioactive elements. A spectral gamma ray log provides a reading for each element so anomalies in concentration can be found and interpreted.

Gamma ray logs, like other types of well logging, can be performed by lowering an instrument down the drill hole and recording gamma radiation variation with depth. Gamma radiation is usually recorded in API units, a measurement originated by the petroleum industry. Gamma ray logs, however, may be attenuated by diameter of the borehole or because of the properties of the fluid filling the borehole.

A total gamma ray log provides the number of natural gamma rays emitted by the rocks surrounding the tool, which is typically proportional to the amount of shale in the rocks. The spectral gamma ray measurement breaks up or divides the total gamma ray response into three components, namely those due to potassium, thorium, and uranium. The spectral gamma ray measurement is useful to distinguish the mineralogy in shale or other radioactive minerals. Also, the logging of gamma rays can be performed in air or mud filled open holes, and in cased holes, wellbores or wells. However, the response may be attenuated by the cement and pipe thickness in cased holes and the like.

Radiation is naturally erratic. A stationary detector, for example, will not see a constant stream of gamma rays in a given gamma ray flux. To obtain a reliable count rate, measuring tools often record the total number of emissions over a period of time, known as the time constant. For most gamma ray tools, the time constant can be one or two seconds for wireline and longer for LWD in order to obtain a smooth log curve. The time constant is selected such that the logged depth interval is approximately 6 inches or smaller for typical logging speed of each application. The differences in count rates (between one time constant and another) are often referred to as statistical variations.

The total gamma ray tool can measure the number of gamma rays at all energy levels and from all directions. The total gamma ray imaging tool, however, takes measurements in one direction only and utilize a shield to create directional preference. Measurements taken in one direction only are sometimes referred to as an "azimuth bin."

Natural gamma ray spectroscopy is a technique for measuring the number and energy of gamma rays emitted as natural radioactivity by the formation. Natural gamma ray spectroscopy (also referred to herein as "spectral gamma ray spectroscopy" or "total gamma ray spectroscopy") is a technique used to log information about the formation. Total gamma ray spectra can be resolved into the three most common components of naturally occurring radiation in sands and shale: potassium; thorium; and uranium (the element symbols being "K," "Th," and "U," respectively, as sometimes used herein). This data can distinguish important features of the clay or sand around the wellbore. For example, the deposition of radioactive salts behind the casing by the movement of water can also be identified. The radioactive isotopes of potassium, thorium, and uranium each emit gamma rays that have characteristic energy levels. The quantity and energy of these gamma rays can be measured in a scintillation detector.

A log of natural gamma ray spectroscopy is typically presented as a "spectral gamma ray log" which provides the weight fraction of each of the elements, potassium, thorium and uranium. Hence, the natural gamma ray spectrometry tool can use a five-window, three window and full spectral analysis to resolve the total gamma ray spectra into K, Th, and U curves. The standard gamma ray and the gamma ray minus the uranium component are also provided. The computed gamma ray or Th curve can be used to evaluate the clay content when radioactive minerals are present.

The scintillation detector is a device for measuring the number and energy of gamma rays. The device has a crystal and a photomultiplier. In the crystal, an incident gamma ray imparts energy to electrons through Compton scattering, photoelectric absorption and pair production. The electrons excite the detector crystal lattice. Crystal de-excitation emits visible or near-visible light, the scintillation, which is detected by the photomultiplier and transformed into an electrical pulse. The frequency and amplitude of the electric pulse are related to the number of gamma rays and their respective energy levels, and are recorded in a log. Scintillation detectors can be used in natural gamma ray, induced gamma ray, and density logging devices.

Another type of sensor used in LWD gamma ray tools is a Geiger-Muller (GM) tube which relies on the interaction of gamma radiation with a thin platinum layer on the inside of the tube to create positively changed ions and electrons. The electric field created by the electrodes accelerates ions towards a cathode and electrons toward an anode. This eventually results in an avalanche of charged particles and a short intense pulse of current. The pulse is then recorded as a count. GM tubes can operate in temperatures of 175° C.

A primary drawback of prior art methods that produce images is the lack of information about the formation mineral composition. For example, methods have been previously developed for producing images using total gamma ray tools, sensors and/or detectors on a bottom hole assembly (referred to herein sometimes as "BHA"). See e.g., U.S. Pat. No. 8,049,164, Col. 1, ls. 33 to 63, incorporated herein by reference. To produce images with gamma ray measurements, a radiation detector is used to take gamma ray measurements and an azimuth is then associated with the measurements. The elemental composition of the formation is then estimated from a plurality of azimuths. Id. at Col. 2, ls. 6 to 32, incorporated herein by reference. A feature of this prior art method and device is the use of collimated sources and detectors. Collimation can be achieved by eccentric positioning of the source and detectors, use of shielding, or combination of these approaches. Id. at Col. 4, ls. 40 to 47. For example, Boron-coated Tungsten shield can be used as well as other approaches known in the art. Using these or other shielding approaches known in the art, the azimuthal sensitivity of the tool can be increased. Id.

As noted above, prior art imaging systems commonly require a shielded imaging tool. For example, sometimes the gamma detector is placed in a pressurized housing and inserted in the center of a logging collar. In this case, formation gamma rays then travel from the formation, through the mud in the annulus and bore as well as the drill collar. The collar absorbs formation gamma rays and barite. Also, other drilling mud weighting material absorbs radiation. Therefore, the gamma ray tools and associated systems generally have poor statistical accuracy and are often limited to total gamma ray measurements.

In other prior art configurations, a detector can be mounted in an insert and into the drill collar. Gamma rays have to travel through the mud-filled annulus and the drill collar and hence significant amount of gamma rays are absorbed. Depending on the location of the detector and the amount of shielding, this type of configuration is used for azimuthal binning; but due to lower statistical count rates, images tend to be limited to total gamma ray imaging, especially in fast drilling applications where rate of penetration is high. Even when the detector is placed outside the collar (which allows the maximum number of gamma rays to reach the detector), the measurement is not optimized for spectral gamma ray measurement. Furthermore, the collar mounted design has limited space for a detector, especially if the mud flow tub is centered. However, effective spectral gamma ray measurement detectors typically have a large diameter. Therefore, prior art total gamma ray imaging tools generally have shielding in order to create azimuthal sensitivity to gamma rays.

One solution to the dilemma of shielding is the use of two gamma ray detectors: one dedicated for spectral gamma ray measurement and the other for total gamma ray imaging.

The two separate measurements, spectral gamma ray measurement and the total gamma ray imaging, are combined together to form or produce elemental images. One advantage of this methodology is that both spectral gamma ray measurement and total gamma ray imaging (also sometimes referred to herein as "azimuthal gamma ray imaging," or, in the singular or plural as a "total gamma ray image" or "total gamma ray images") can be optimized independently because measurements are taken by and made from different gamma ray tools (such as LWD or MWD described herein), gamma ray detectors, and/or gamma ray sensors. As used herein, the term "measurement" can mean a measurement in the singular or plural, or both singular and plural, and is sometimes referred to herein as a "plurality of measurements," a "log," or "logs."

The present disclosure provides methods of formation imaging (also referred to as "K, U, and Th imaging"), methods of producing elemental images (also referred to as "formation K, U, and Th images" or "formation images") and systems for implementing the formation imaging methods and/or producing the elemental images. The methods described herein are useful to analyze formations, and are useful in geosteering applications such as geosteering of drill bits and bottom hole assemblies ("BHA"), and a wide variety of other applications.

Generally and as described herein, in order to measure elemental imaging or produce an elemental image directly, gamma rays are sorted according to azimuthal bins and energy bins. Whenever a bin is added, however, the counting statistics for that bin becomes poorer. Therefore, the measurements cannot be made directly. Therefore, using the methods of elemental imaging described herein, two existing measurements: spectral gamma ray measurement and total gamma ray imaging can be combined for precision of measurement.

Gamma ray logs can be derived from total gamma ray imaging by summing over all azimuth bins at each measured depth. Alternatively, gamma ray logs can be derived from a spectral gamma ray measurement by summing over all energy bins. By default, a total gamma ray log is associated with a spectral gamma ray measurement and the derived total gamma ray log is associated with total gamma ray imaging. In theory, a total gamma ray log of the spectral gamma ray measurement should be the same as the derived total gamma ray log from total gamma ray imaging. In reality, they are not exactly the same. However, in the methods desired herein, the total gamma ray log of the spectral gamma ray measurement is assumed to be the same and interchangeable with the derived total gamma ray log reduced from total gamma ray imaging.

The systems provided herein include a spectral gamma ray tool that measures the concentration of potassium, uranium, and thorium in rock formations as a function of measured depth. The systems can also include an azimuthal gamma ray imaging tool (also referred to herein as a "total gamma ray imaging tool"). The azimuthal gamma ray imaging tool measures the level of formation total gamma activity as a function of both tool face and measured depth, forming a total gamma ray image. From the total gamma ray image, the structure information of the formation layers, primarily the relative dip angles between the formation layers and the borehole, can be derived. Natural gamma rays are originated from potassium, uranium, and thorium in rock formations. Therefore, the same structure information of formation layers derived from the total gamma ray imaging also apply to formation potassium, uranium, and thorium concentrations. Thus, imaging of formation potassium, uranium, and thorium concentration is achieved.

Spectral gamma ray tools which may be useful in connection with the described methods herein include, but are not limited to wireline tools such as Hostile Environment Natural Gamma Ray Sonde (HNGS®), Natural Gamma Ray Spectrometry tool (NGS®) by Schlumberger and logging-while-drilling ("LWD") tools such as TelePacer® by Schlumberger and SpectralWave™ Spectral Azimuthal Gamma Ray (SAGR) Sensor by Weatherford. Both the HNGS® tool and the NGS® tool can be used for cation exchange studies, reservoir delineation, detailed well-to-well correlation, definition of faces and depositional environment, igneous rock recognition, recognitions of other radioactive materials, estimated uranium and potassium potentials, and lithologic analysis log input analysis.

The HNGS® spectral gamma ray tool uses a 256-window spectroscopy to resolve the detected spectrum into the components of naturally occurring radiation: potassium, thorium, and uranium. This tool includes a set of detectors that are designed to improve the statistical response of the tool to the formation gamma rays in order to produce a better spectral analysis and use two bithmus-germanate (BGO) scintillation detectors instead of one. It has a relatively large detector volume and has a high gamma ray stopping power to make it effective. On the combination tool string, the HNGS® tool is always run at the top. At least one pass is made past the mudline for correct location of the mudline itself. Depending on the environment, this tool may be run on additional tool strings as well. The HNGS® tool has a temperature rating of 500° F., or 260° C., and is suitable for operations in hot borehole environments. Furthermore, the HNGS® tool can withstand pressures of up to 25,000 psi (172 MPa). However, the minimum borehole size in which the tool can be used cannot be smaller than 4¾ inches, or 12.07 cm, with no maximum borehole limitation. Furthermore, the tool generally has a 3.75 inch, or 9.53 cm, outer diameter, it is 11.7 feet, or 3.57 meters, in length, and weighs 276 lbm, or 125 kg. The tool has further capacity to withstand tension of 50,000 lbf (222,410 N) and compression of 23,000 lbf (102,310 N).

The NGS® natural gamma ray spectrometry tool uses five-window spectroscopy to resolve the total gamma ray spectra into K, Th, and U curves. The standard gamma ray and the gamma ray minus uranium component are also provided. The computed gamma ray or Th curve can be used to evaluate the clay content where radioactive minerals are present. Its temperature rating of 302 degrees Fahrenheit, or 150° C., makes it slightly less suitable for operations in extremely hot borehole environments. The NGS® tool can withstand pressures of up to 20,000 psi (138 MPa). The minimum borehole size for this tool is than 4' inches, or 11.43 cm, with no maximum borehole limitation. Furthermore, the tool generally has a range of 3.625 inches and up to 3.875 inches, or 9.53 cm, outer diameter, and is 8.6 feet, or 2.62 meters, long. Its weight can range from 165 lbm, or 75 kg to 189 lbm, or 86 kg. The tool has further capacity to withstand tension of 50,000 lbf (222,410 N) and compression of 20,000 lbf (88,960 N).

Both, the HNGS® and NGS® tools, have a logging speed of 1800 feet per hour, or 549 meters per hour and can produce gamma ray outputs, as well as corrected gamma ray for uranium and potassium, thorium and uranium curves. They have a range of 0 to 2,000 gAPI range of measurement with vertical resolution of 8 to 12 inches, or 20.32 to 30.48 cm. Their depth of investigation capabilities are 9.5 inches, or 24.13 cm. While both the HNGS® and NGS® tools can be used together with other tools, these tools have a mud type or weight limitation such that when used in KCl muds, KCl content must be known prior to their use.

The TelePacer® system, currently provided by Schlumberger, is a modular measurement while drilling ("MWD") system useful in factory and pad drilling operations, well placement, underbalanced drilling, air drilling, shale gas and oil drilling, coalbed methane drilling and steam-assisted gravity drainage ("SAGD"). The utility and design of this MWD system addresses challenges of unconventional reservoirs in that this tool reduces collision risk, improves drilling efficiency, and maximizes sweet-spot exposure with a configurable suite of integrated measurements. The TelePacer® system can be configured to transmit data using electromagnetic ("EM") or positive-pulse ("PP") telemetry, depending on formation characteristics. When downhole conditions are compatible with EM telemetry, the TelePacer® system (also referred to herein sometimes as a "platform") has an express configuration that enables bidirectional communication between surface and the BHA at 16 bps—10 times faster than PP telemetry. With no moving parts, the tool is also highly durable. For survey services for increased certainty and reduced risk, the TelePacer® system uses six-axis survey measurements to reduce risk by increasing positional certainty with reliable data. To increase lateral and TVD certainty, survey optimization services can be added to provide wellbore separation assurance to achieve production objectives.

For casing exits and other situations with magnetic interference, the TelePacer® system includes a gravity MWD tool that provides a nonmagnetic azimuth measurement. For measurements for maximized drilling efficiency and sweet-spot exposure, the tool takes total, spectral, and image GR measurements to provide additional information for well placement and formation evaluation. These API-calibrated measurements are highly repeatable, and are transmitted with no impact to drilling efficiency using the TelePacer® system express configuration. Downhole rpm and shock and vibration monitoring allow rapid response to harmful drilling dynamics by adjusting drilling parameters for better drilling performance and risk mitigation. The TelePacer® tool can have single, split and retrievable collar configurations. This tool and associated system further provides stick/slip and three-axis shock and vibration monitoring and can measure annular and drill pipe pressure.

The SpectralWave™ tool by Weatherford provides real-time spectral gamma ray data (K, U, Th), azimuthal gamma ray borehole images, and total gamma ray information while drilling. Real-time borehole images facilitate geosteering and provide formation structural information. Hence, as with other tools described herein, useful applications of this tool include evaluation of shale organic content from relationships between uranium and Total Organic Carbon, evaluations of shale reservoir clay content from potassium and thorium, even in the presence of kerogen-associated uranium, which invalidates clay evaluation from total gamma ray, geosteering from high-quality, real-time, up-down 4 quadrant, or 16-bin gamma ray borehole images, accurate well-to-well correlation from high-precision total gamma ray measurement, and clay typing from K, U, and Th data. The SpectralWave™ sensor includes large, gain-stabilized scintillation detectors located in pockets on the outside of the drill collar, with three detectors in the 6¾-inch tool, and one detector in the 4¾-inch tool. Detector placement minimizes the steel between the detector and the formation to reduce spectral smearing of the gamma ray energies and azimuthally focuses the measurement by shielding the back and sides of the detectors. The detectors provide a high-count rate, even at fast drilling rates. The tool further incorporates X-Y magnetometers to track the azimuthal position of the detectors as the tool rotates. The tool has real-time measurement range of 0 to 1,265 gapi and recorded measurement range of 0 to +4,000 gapi. It has a vertical resolution of 12 inches (30.48 cm). The SpectralWave™ tool provides accuracy of total gamma ray measurements of ±2 gapi and total gamma ray repeatability of ±0.8 to ±1.4 (gapi at 100 gapi for a 20-second sample), with uranium accuracy range of ±3 to ±5% of measured value, potassium accuracy of ±5 to ±9% of measured value, and thorium accuracy of ±6 to ±10% of measured value.

Total gamma ray imaging tools which can be used in the described methods herein include, iPZIG® at-bit inclination, gamma ray and imaging system and associated tools by Schlumberger, EcoScope® system and associated tools by Schlumberger, TelePacer® system and associated tools by Schlumberger, and SpectralWave™ Spectral Azimuthal Gamma Ray (SAGR) sensor by Weatherford.

The iPZIG® at-bit inclination, gamma ray and imaging system and associated tools are designed to optimize well placement in target zones through early bed boundary detection. The technology provides real-time, at-bit 8- to 16-sector image natural gamma ray and dynamic inclination measurements. The iPZIG® tool can be positioned directly behind the bit and provides at-bit gamma ray imaging, along with traditional natural gamma ray measurement, as well as revolutions per minute (rpm), and temperature. This tool operates as two separate subs, making the inclination and gamma ray image sensors completely independent of the mud motor. The lower transceiver sub ("LXM") houses the sensor packages, batteries, and electronics to process measurements and data, is placed directly behind the bit, acquires data that it transmits to the upper sub ("UXM"), located above the motor. The UXM transfers the at-bit measurements via a real-time data link connection to this MWD tool for mud pulse telemetry to the surface. The information is then sent to the surface using MWD telemetry systems. Real-time data and information enhances geosteering capabilities at the surface. The iPZIG® system reduces the reaction time for making geosteering decisions and maintaining the wellbore in the targeted interval.

EcoScope® system integrates a full site of formation evaluation, well placement, and drilling optimization measurements in a single collar to increase operational efficiency, reduce risk, and increase confidence in data interpretation and calculations of production and reserves. The EcoScope® system allows to measure resistivity, neutron porosity and azimuthal gamma ray and density, and in addition provides LWD measurements of elemental capture spectroscopy, neutron gamma density, and sigma. EcoScope® system uses a pulsed neutron generator ("PNG") that allows generation of neutrons on demand. This design eliminates the need for americium beryllium (AmBe) chemical source. The PNG generates more neutrons with much higher energies, than a traditional AmBe chemical source. This provides deeper, more precise measurements and also enables the EcoScope® tool and associated system to acquire nuclear spectroscopy, density and sigma measurements in addition to the formation evaluation suite of measurements. These nuclear measurements, made close to the bit, further reduce the uncertainty in data interpretation. However, measurement of formation density without the side-mounted cesium source is an option. Furthermore, the EcoScope® system integrates multiple LWD sensors in a single collar, reducing the amount of rat hole that is drilled.

In addition, the location of the LWD sensors in a single collar and close to the bit, allows for reduction of flat time associated with making up and breaking down the BHA. The EcoScope® system has a large memory capacity allowing to record 2 data points/ft at ROPs up to 450 ft/h. Its dedicated internal diagnostic electronics, such as chips, record and provide information for preventative maintenance.

As can be appreciated, sometimes the total gamma ray imaging is provided as one of multiple measurements offer by the system, such as in EcoScope® system. In addition, for both SAGR system by Weatherford and TelePacer® system by SLB, both tools can measure both spectral gamma and total gamma ray imaging. SpectralWave™ Spectral Azimuthal Gamma Ray (SAGR) sensor uses the same detector for both measurements. The TelePacer® system utilizes separate detectors, one for each measurement. The present methods can be carried out using either one or separate tools, sensors, detectors and/or systems described herein or other tool and systems having the similar capacities and function.

For example, the Hostile Natural Gamma Ray (HNGR™) tool can be run alone or with any other hostile service in either an open or cased hole. The Compensated Spectral Natural Gamma Ray (CSNG™) system and associated tools measure a gamma ray spectrum from 0 to 3,000 keV. This system uses full-spectrum processing to provide accurate logs of potassium, uranium, and thorium concentrations. Measurement precision curves and tool diagnostics can validate logging data quality. The CSNG™ tool further uses a stabilizer system for temperature related drift in the gamma ray energy gain and offset conversion. The full-spectrum processing performs additional refinement of the energy calibration and compensates for variations in detector resolution. Also, the CSNG™ system can provide real-time outputs corrected for the borehole environment and converted to standard conditions (8.625 inch borehole, freshwater borehole, no casing, and tool centered). Estimates of borehole potassium concentration and photoelectric absorption made during the log are helpful to confirm real-time corrections. In addition, it can detect reproducible zones by distinguishing clean reservoir rock or radioactive pay zones. Furthermore, it can measure U, K, and Th concentrations and can reveal fractured or highly permeable reservoirs. The CSNG™ system can further determine clay types, volumes and cation exchange capacity. The CSNG™ system can locate radioactive tracers with a single pass of the CSNG™ tool.

FIG. 1 is a flowchart 10 that shows the methods of elemental imaging of formation provided herein. These methods comprise acquiring spectral gamma ray measurement from a first detector (12) and acquiring total gamma ray image from a second detector (14). Formation structure information is then derived from the total gamma ray image (16). The derived structure information is then applied to the spectral gamma ray measurement (18) where images of elemental concentrations, otherwise referred to herein as "elemental images" are obtained.

Figure 2:
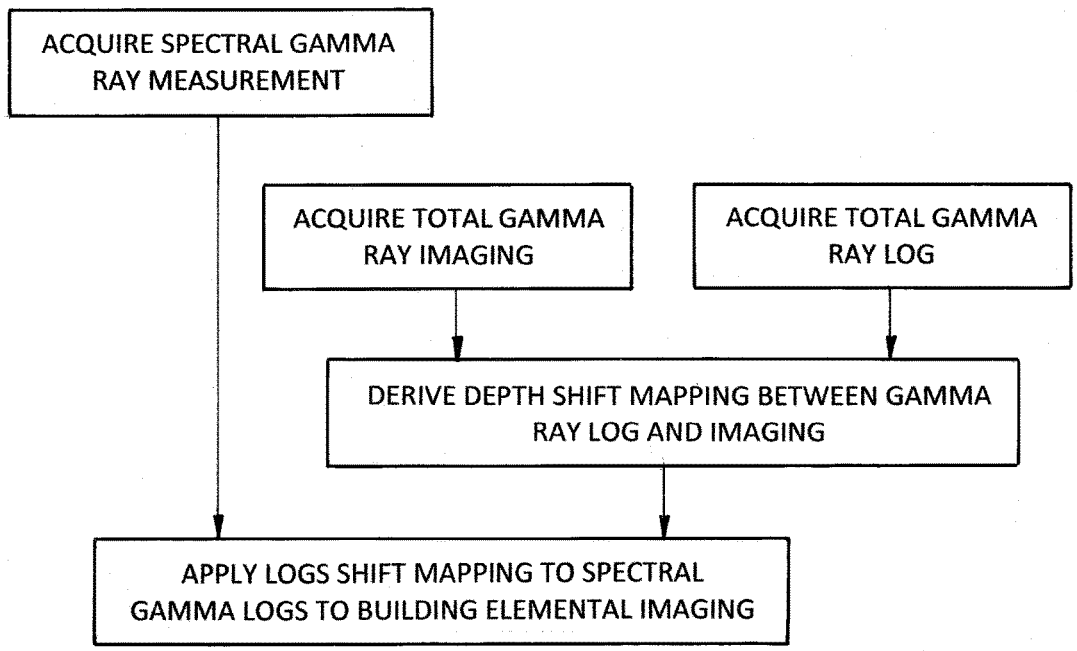
FIG. 2 is a flow chart illustrating a method to derive structure information from the gamma ray image and apply that information to the spectral gamma ray measurement in order to obtain images of elemental concentrations.

An alternative method can be used to derive structure information from the total gamma ray image and to apply the structure information to the spectral gamma ray measurement. FIG. 2 is a flow chart that illustrates one such alternative. As shown, these methods include generating a depth-shift map and applying the depth-shift map to the spectral gamma ray measurement to obtain the elemental image. In the embodiment of FIG. 2, the derived total gamma ray log (20) is acquired from the total gamma ray image (14). Noteworthy is that the total gamma ray log can be measured by either the spectral gamma ray tool or the total gamma ray imaging tool. For spectral gamma ray tools, the total ray gamma log will be a summation over all energy bins. For gamma ray imaging tools, the total ray gamma log will be a summation over all azimuth bins.

To acquire the derived total gamma ray log, the total gamma ray image can be acquired by the total gamma ray imaging tool. The total gamma ray log can be acquired by the spectral gamma ray tool or by the total gamma ray imaging tool. Also, as described herein, the total gamma ray image can be acquired from the total gamma ray imaging tool, or derived (reconstructed) from a gamma ray log taken by either the spectral gamma ray tool or the total gamma ray imaging tool. For total gamma ray imaging tools, the total ray gamma log will be a summation over all azimuth bins. For spectral gamma ray tools, the total gamma ray log will be a summation over all energy bins.

Gamma ray logs taken by the spectral gamma tool or taken by the total gamma ray imaging tool are assumed to be the same because each tool measures the same properties of formation. In reality, they are not identical. However, in the methodologies presented herein, the gamma ray logs are considered to be identical. Thus, gamma ray logs can be derived from the total gamma ray image or provided by the spectral gamma ray measurement. The derived total gamma ray log is the link that connects the spectral gamma measurement and the total gamma ray imaging.

In 22, the depth shift map can be generated by comparing the total gamma ray image in that sector to the total gamma ray log. By repeating 22, the total gamma ray image is compared to the total gamma ray log for all azimuthal sectors, and the depth-shift map obtained. As shown in 24, the depth-shift map is then applied to spectral gamma ray measurement to build an elemental image for each of formation potassium, uranium, and thorium. This is sometimes referred to as "logs shift mapping" or "depth shift mapping."

Figure 3:
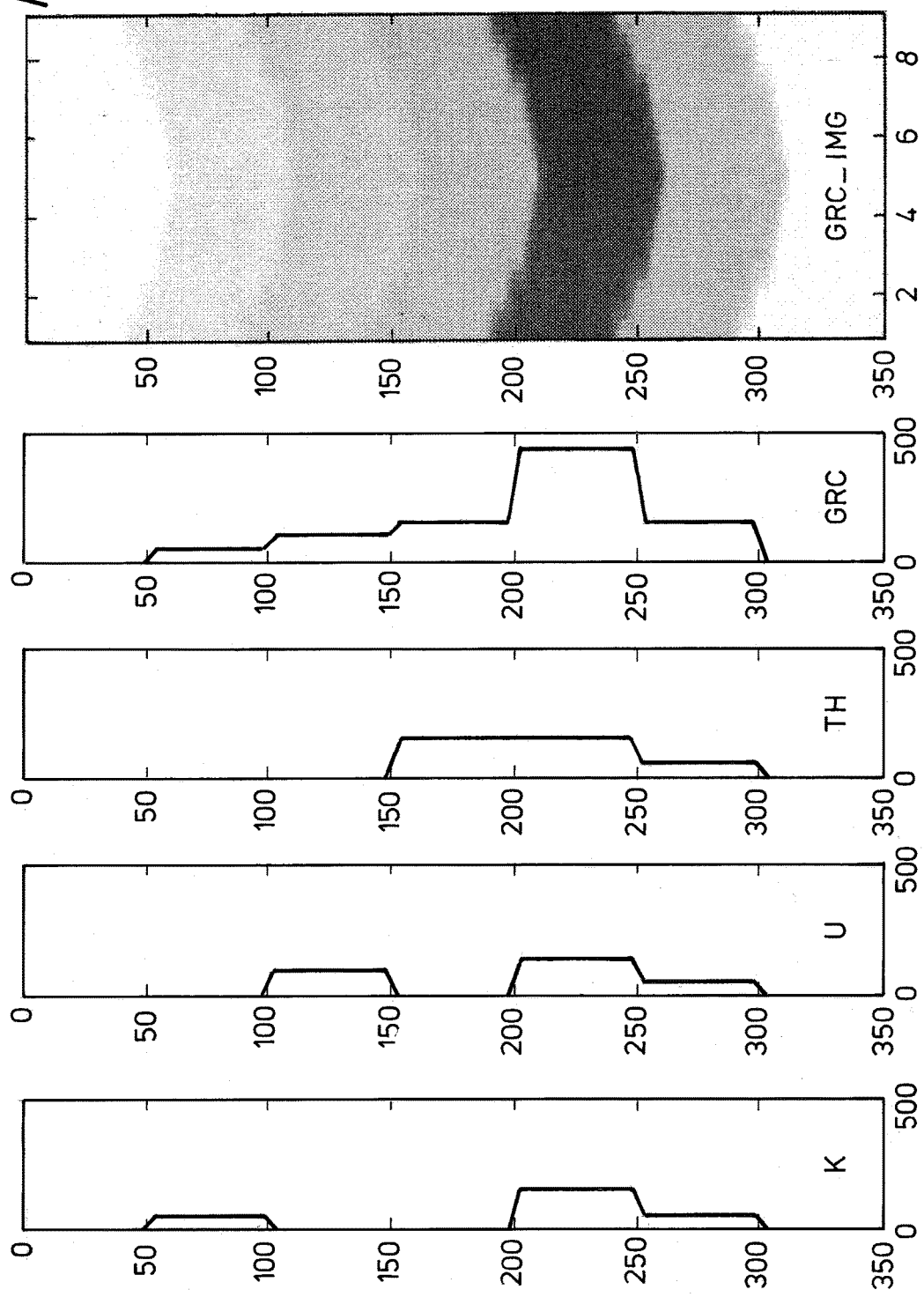
FIG. 3 is an example of spectral gamma ray measurement and a gamma ray image.
Figure 4:
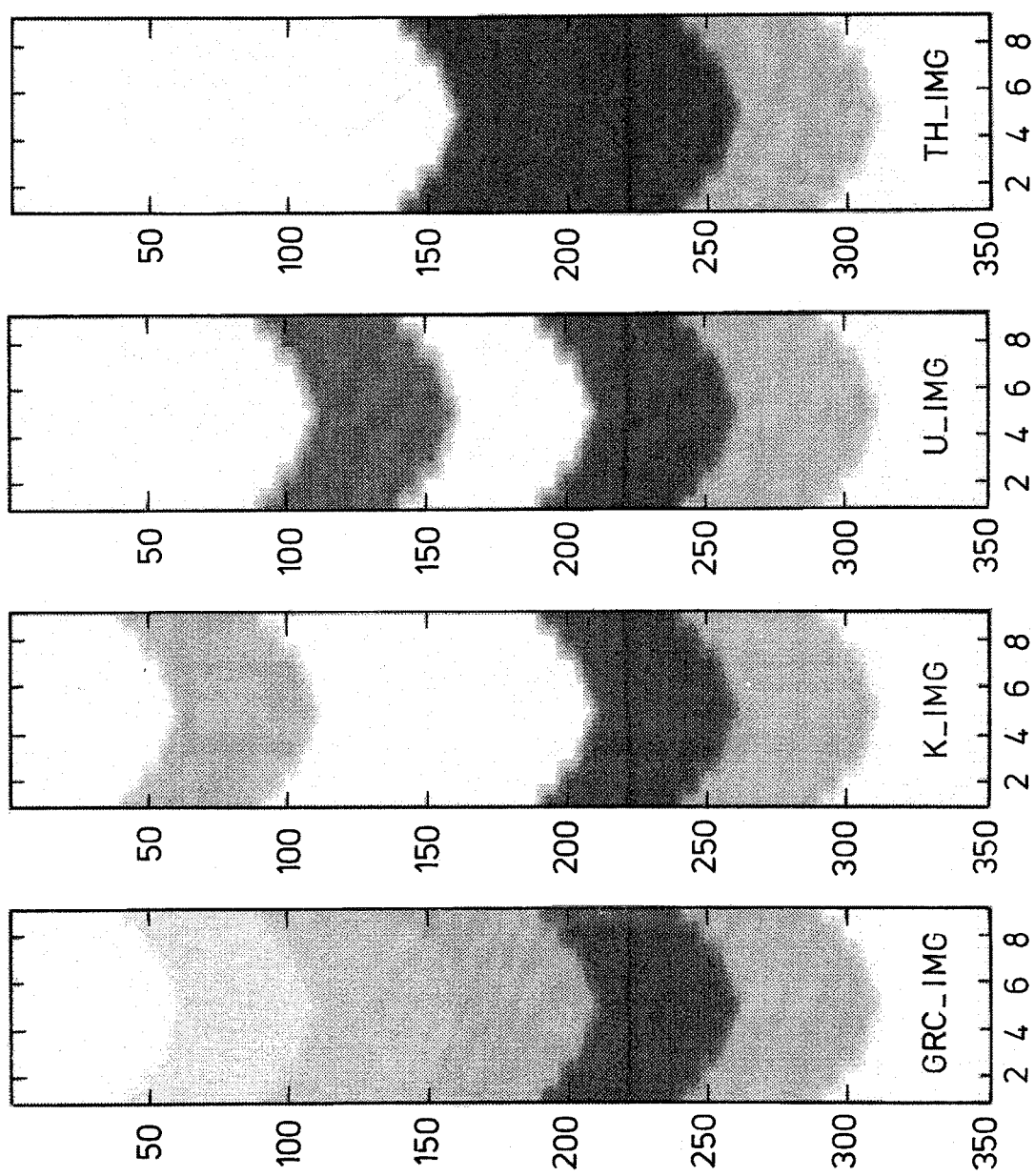
FIG. 4 is an example of elemental images derived from the structure information as applied to the spectral gamma ray measurement.

FIGS. 3 and 4 are each examples of the methods shown in FIG. 2 where the first three traces are concentrations of potassium, uranium, and thorium from spectral gamma ray measurement. The fourth trace is the total gamma ray log. The last trace is the total gamma ray image. As shown, the structure information of the formation layers is relative simple. For this example, the spectral gamma ray measurement in the first azimuthal sector is depth-shifted upward by 10' compared with the total gamma ray log shown in the fourth trace while it is depth-shifted downward by 10' for the spectral gamma ray measurement in the middle (the 5$^{th}$) sector. Using the depth-shift information (depth-shift map) derived for each azimuthal sector, images of formation potassium, uranium, and thorium can be obtained for each azimuthal sector. FIG. 4 are the elemental images derived. The depth-shift calculation is relatively simple. But, in practice, the depth-shift can be very complicated.

Figure 5:
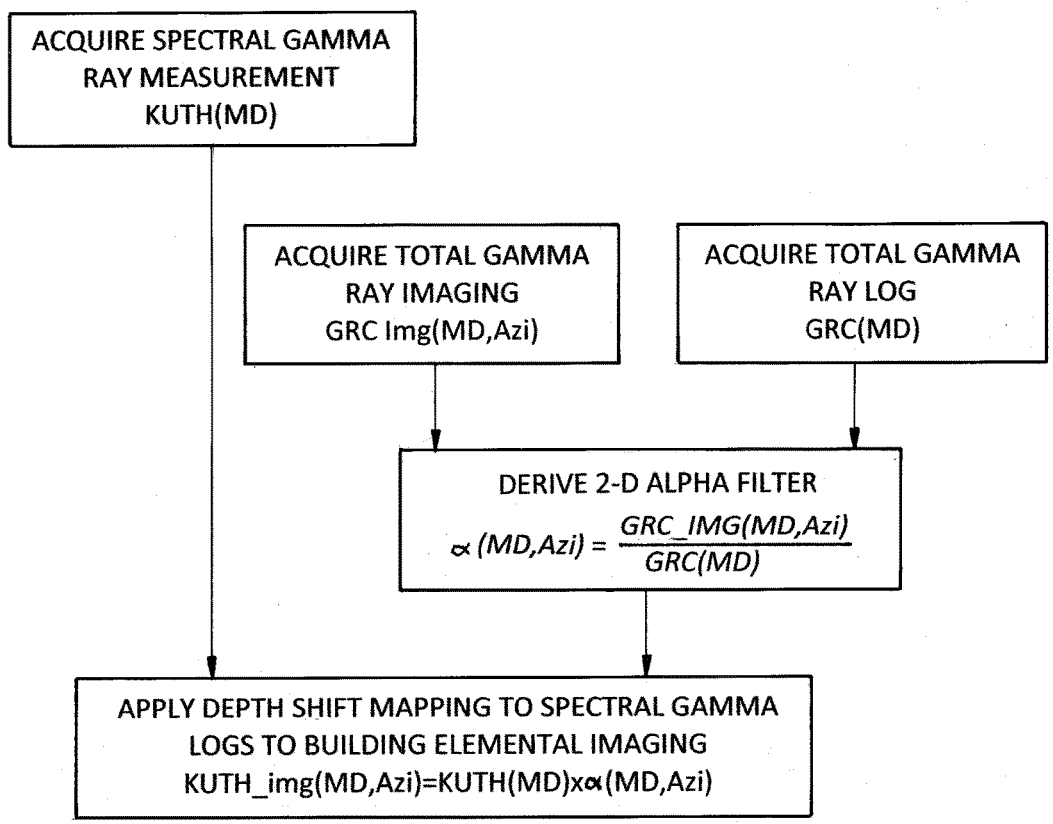
FIG. 5 is a flow chart of an embodiment of the present methodologies using a 2-D alpha filter.

FIG. 5 is a flow chart that demonstrates an embodiment of the present methodologies using a 2-D alpha filter. 2-D alpha filter describes the difference between a total gamma ray image (2-D image as a function of measured depth ("MD")), azimuthal tool face, ("Azi") and the total gamma ray log (1-D image as function of measured depth MD). The 2-D alpha filter can then be applied to the spectral gamma ray measurement to form the elemental image.

GRC IMG(MD,Azi) is the total gamma ray image, 2-D array

GRC (MD) is the total gamma ray log.

$$\alpha(MD, Azi) = \frac{GRC\_IMG(MD, Azi)}{GRC(MD, Azi)}$$

Figure 6:
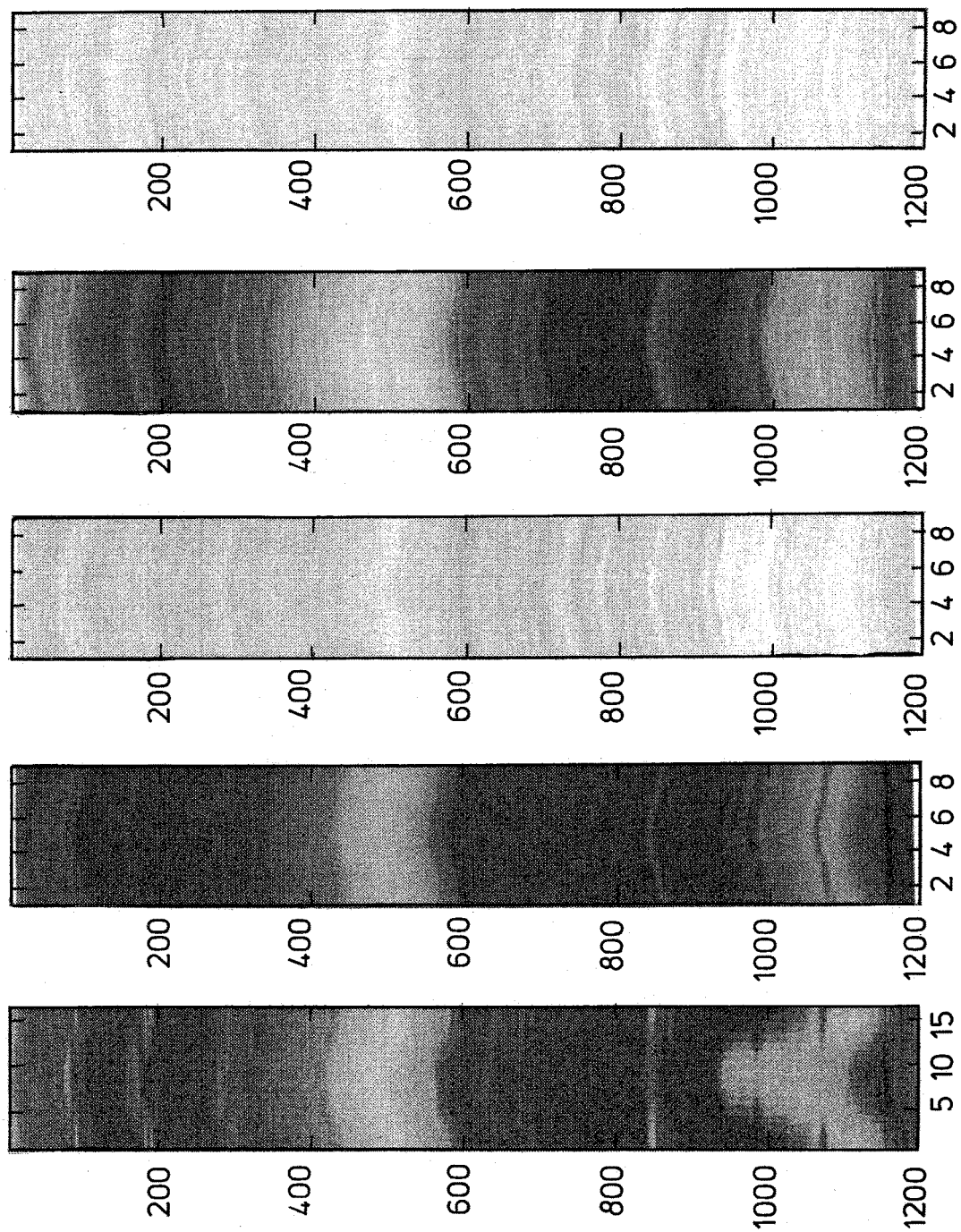
FIG. 6 is an example of the present methodologies using a 2-D alpha filter where the first image GRC_IMG is the total gamma ray image and the second image GRC_M is the total gamma ray image reconstructed from the total gamma ray log after applying a simple depth-shift map.

GRC (MD, Azi) is the initially reconstructed total gamma ray image from the total gamma ray log GRC(MD) by either copying itself to each azimuthal bin or applying some basic depth shift first and then copying to each azimuthal bin (FIG. 6).

α(MD,Azi) is the 2-D alpha filter and is straightly the ratio between GRC_IMG(MD, Azi) and GRC(MD,Azi), pixel by pixel.

In this way, the total gamma ray image GRC_IMG(MD, Azi) can be produced from the total gamma ray log GRC (MD). By applying the same procedure to spectral gamma ray logs K(MD), U(MD), and TH(MD), spectral gamma ray image K_IMG(MD,Azi), U_IMG(MD,Azi), and TH(MD, Azi) can be obtained. The basic assumption is that formation K, U, and Th concentrations share the same structure as total gamma ray logs.

Figure 7:
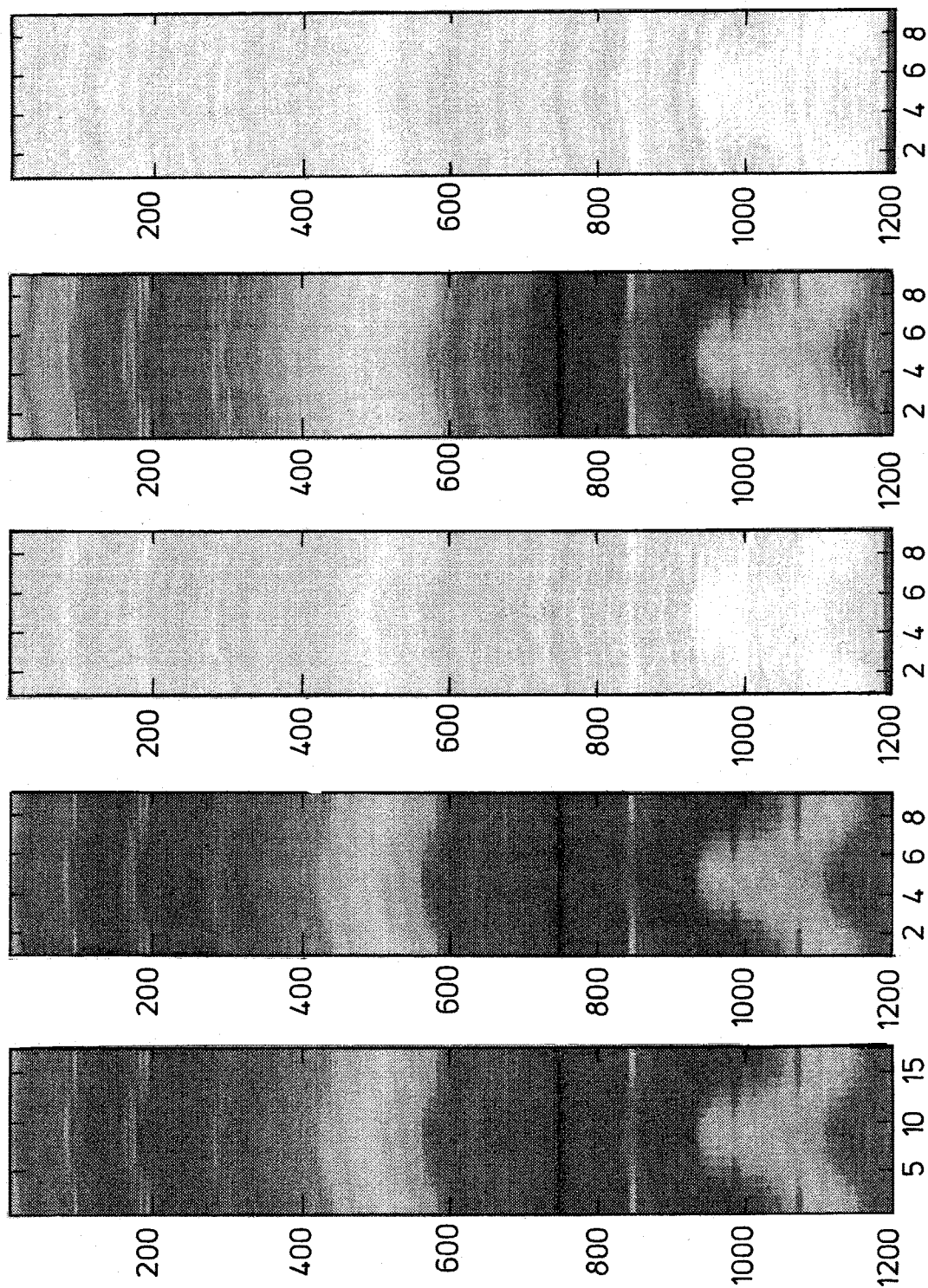
FIG. 7 is an example of elemental images that can be derived from applying the 2-D alpha filter.

In FIG. 6, the first image GRC_IMG is the total gamma ray image. The second image GRC_M is the total gamma ray image reconstructed from the total gamma ray log after applying a simple depth-shift map. Note, there could be instance of no depth shift, but mere copying the same total gamma ray log to each azimuthal sector. However, it is preferable to apply depth shift to get closer to or generate a more precise total gamma ray image). K_M, U_M and Th_M are images of potassium, uranium, and thorium with the same simple depth-shift map applied. The 2-D alpha filter is the ratio between GRC_IMG and GRC_M at each image pixel. The 2-D alpha filter is then multiplied to K_M, U_M and Th_M, to obtain K_IMG, U_IMG, and Th_IMG as the final elemental images. In this example, U_IMG is very similar to GRC_IMG because the formation is rich with uranium and most of gamma rays are from uranium. FIG. 7 are prophetic examples of elemental images that can be derived from applying the 2-D alpha filter.

Figure 8:
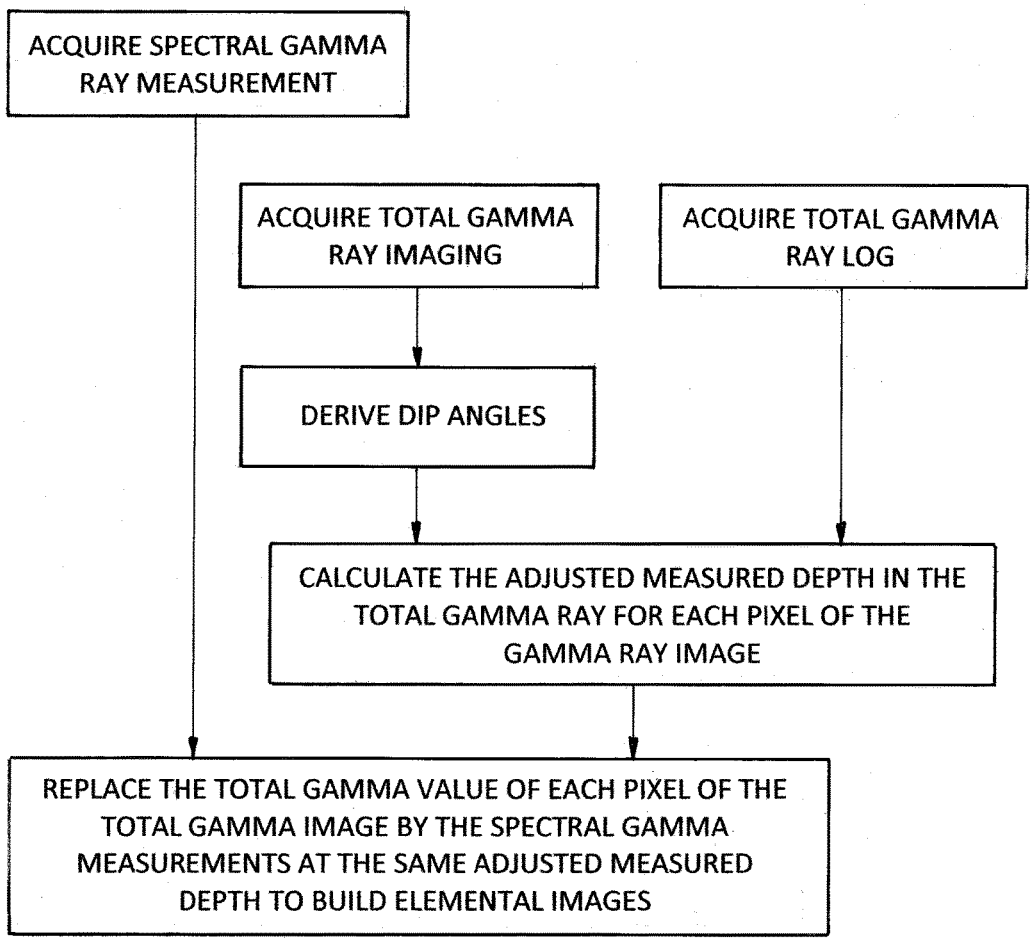
FIG. 8 is a flow chart of an embodiment of the present methodologies using dip angles derived from the total gamma ray images.

FIG. 8 provides an embodiment of the present methodologies provided herein. In 26, dip angles are derived from the total gamma ray images (which were acquired in step 14). In 28, an adjusted measured depth in the total gamma ray log is calculated for each pixel of the total gamma ray image. In 30, a total gamma ray value for each pixel of the total gamma ray image is replaced by the spectral gamma ray measurement (the concentrations of potassium, uranium, and thorium originally acquired in 12) at the same adjusted measured depth to build (generate) the elemental images. The correct spectral gamma ray measurement is found at an adjusted measured depth. The depth shift is then computed on the basis of each pixel.

An imaginary sinusoid can be drawn for an arbitrary pixel in the total gamma image using an adjacent dip angle or a pixel that is interpolated from the adjacent dip angles. Once the adjusted measured depth is found for the pixel, then the spectral gamma measurements (acquired in 12) are at the adjusted measured depth (30) and can be used to replace the total gamma ray value at that pixel. This is then repeated for the entire total gamma ray image to produce the elemental images.

Figure 9A:
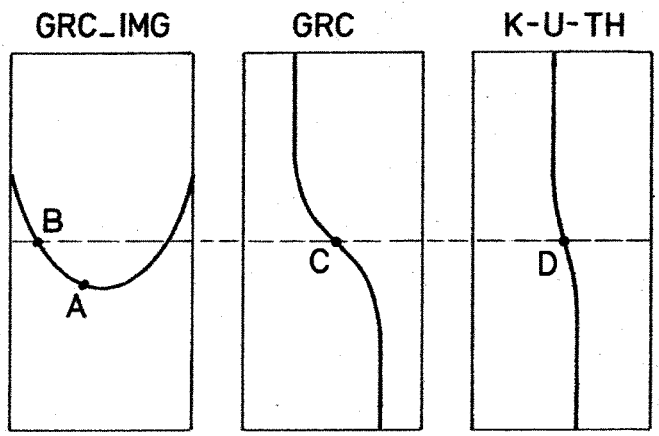
FIGS. 9A and 9B are illustrations showing an adjusted measured depth of a pixel on the sinusoid in the total gamma ray image.

As illustrated in FIG. 9, for the sinusoid picked in the GRC_IMG of the total gamma ray image, every pixel on the sinusoid has the same total gamma ray value. In other words, the average of the two adjacent beds each are considered to have the same adjusted measured depth. The measured depth of the point with the same value in the total gamma ray log is indicated by "C" the intercept with the dashed line. Thus, the adjusted measured depth of each pixel on the sinusoid in the total gamma ray image is the measured depth of a point having the same value in the total gamma ray log. For this example, the adjusted measured depth of each pixel on the sinusoid is the measured depth of the point "C" in the total gamma ray log. Point "D" in spectral gamma ray measurement is at the same measured depth as point "C" and point "B." For point "A", the adjusted measured depth is the measured depth of point "B". The amount of adjustment in depth for point "A" in relative to point "B" is a function of the dip angle and the azimuth of its sector.

Figure 9B:
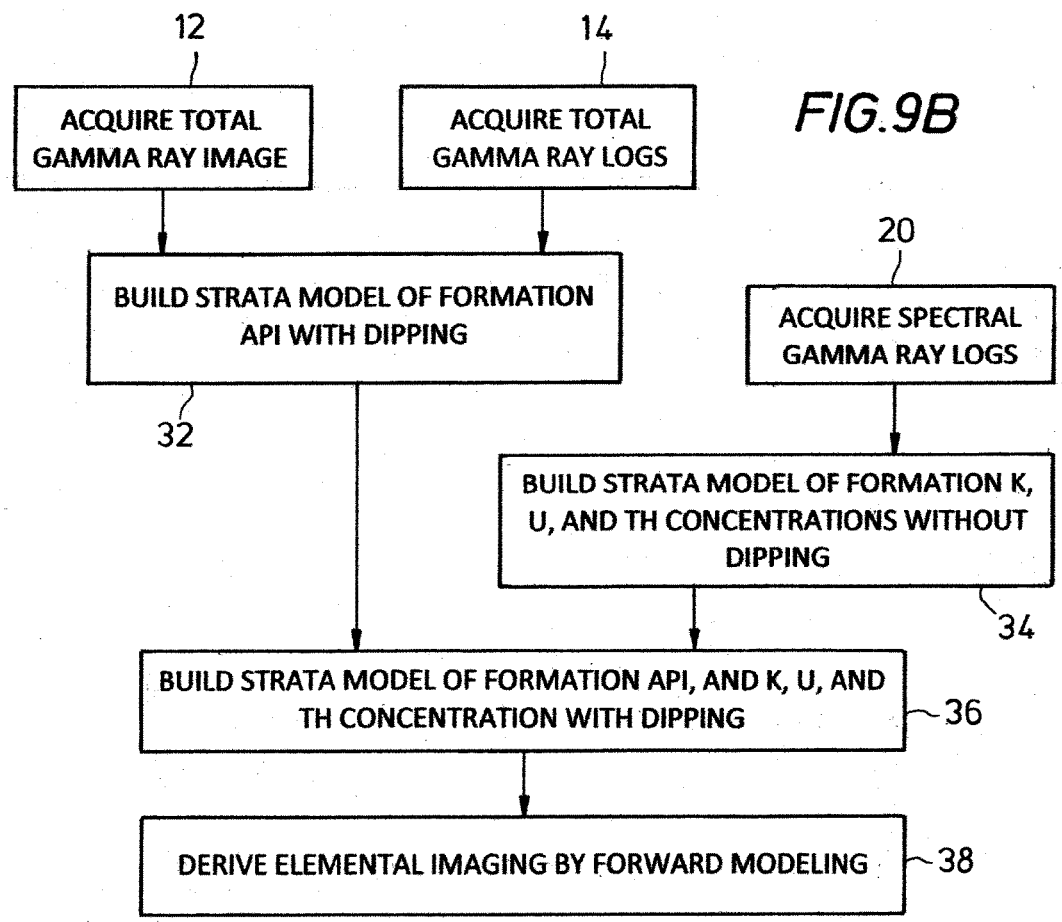
Figure 10:
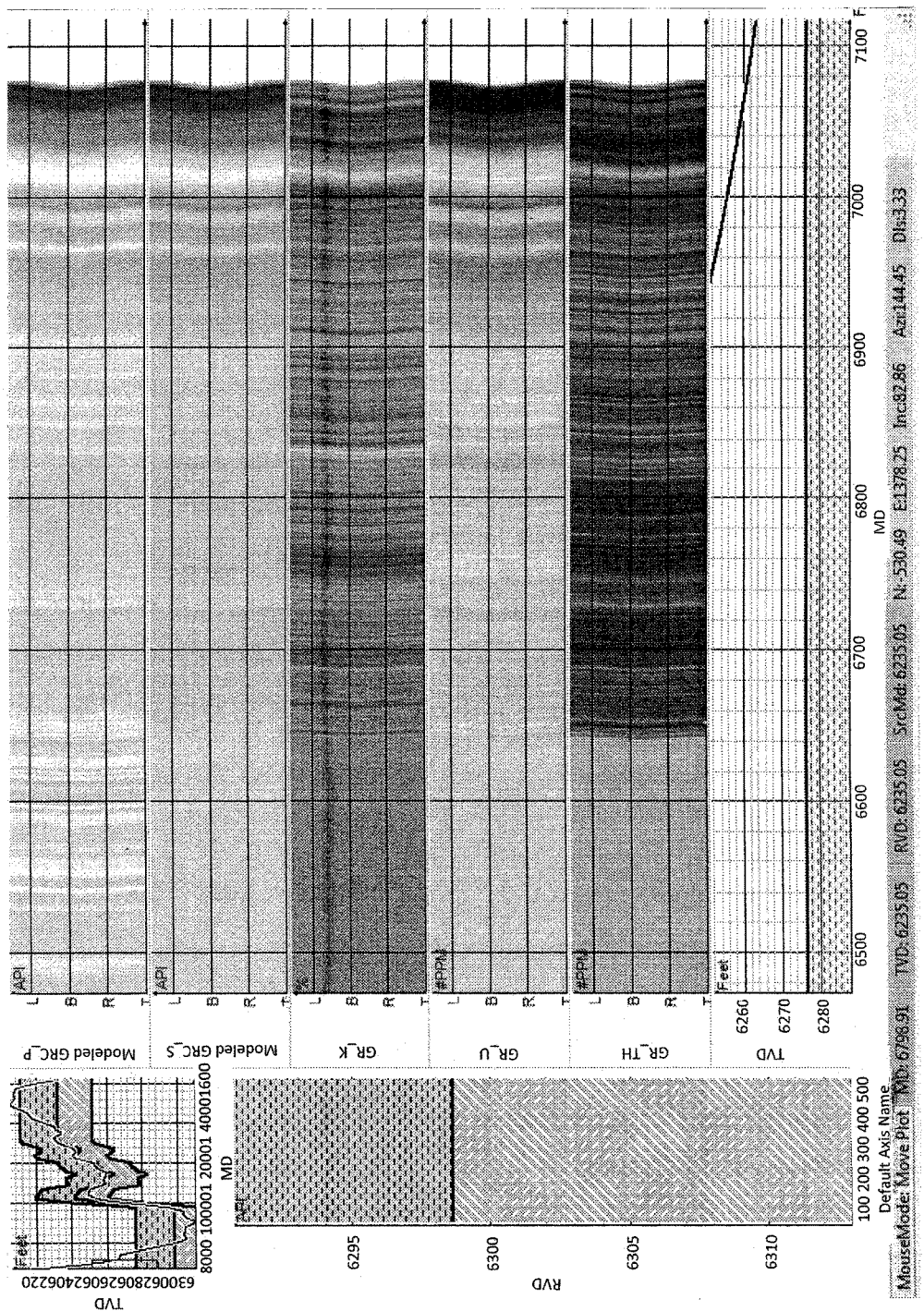
FIG. 10 is a flow chart of an embodiment of present methodologies implemented in real-time geosteering.

Another embodiment of the present methodologies is provided in FIG. 9B. Here, a strata model of formation API can be generated from the acquired total gamma ray log and the acquired total gamma ray image (32), and by using dipping angles. Dipping angles can be derived, for example, from the total gamma ray image and added to the strata model. As shown in FIG. 10, the strata model of formation is first generated for each of potassium, uranium and thorium concentrations, without dipping (34), and as acquired from the spectral gamma ray logs (measurements). The strata model is then built of formation API and K, U, and Th concentrations with the dipping angles applied (36). Forward modeling is then applied to the elemental images from the strata model (38). This methodology is particularly useful in real-time geosteering.

Azimuthal measurements such as spectral gamma ray measurement, total gamma ray logs and total gamma ray imaging and the associated methodologies described herein can provide high quality elemental images of formation which are used in geosteering and formation analysis. During drilling, high-resolution elemental images of the borehole can be combined with other measurements from the logging-while-drilling ("LWD") and/or measurement-while-drilling ("MWD") tools to facilitate proactive geosteering decisions. The elemental images produced by the present methods and systems can help the operator to optimize geosteering during drilling—even with the local structural undulations, variations in the target zone thickness, and lateral property changes in the formation.

For real-time geosteering and geosteering applications, for example, the total gamma ray logs and spectral gamma ray measurement (logs) can be generated from a pilot well to build the strata model of formation, but without information about the dipping angles. While drilling, as the total gamma ray image is acquired and transmitted to surface. The dipping angles can be derived in real-time and the strata model updated with the derived dipping angles. Using the derived dipping angles and the K, U, Th values of the strata model, the elemental images can be modeled in real-time using forward modeling. In FIG. 10, Panel A represents a portion of a prophetic strata rock model. Panel B displays prophetic elemental images of potassium, uranium, thorium, and total gamma ray using the strata rock model.

The novel methodologies described herein can be used to remotely monitor, model, and manage well construction and production operations in real time, 24/7, regardless of location. These systems provide real-time data to make informed decisions and take immediate action when problems occur. As noted herein, wellbores are often logged while drilling and these associated processes are referred to as measurement-while-drilling ("MWD") or logging-while-drilling ("LWD"). Transmission of measurement-while-drilling (MWD) surveys, logging-while-drilling (LWD) measurements and other data, calculations and information can be communicated to the earth's surface using wired drill pipe (WDP) or mud pulse transmission. During WDP operations, both mud pulse transmission and the WDP transmission methods can be used to receive downhole MWD/LWD data. Sensors located along the drill string within the multiple WDP repeater subs can allow computations at multiple intervals along the annulus. WDP also allows for the transmission of high-frequency vibration and collar rotation data from the bottom hole assembly ("BHA"). This can be used to determine the dynamic rotational tendencies of this drill string under varying conditions, which can then be used to calibrate a dynamic mathematical drill string model. The data and information is then used to predict optimum drilling parameters to minimize stick/slip, bit bounce, and bit whirl to optimize rate of penetration ("ROP") and the like.

Mud plus telemetry can be used in connection with the novel methodologies provided herein to communicate data, information and calculations of the present methods. The data and information can be sent to the earth's surface for processing. The effect of MWD and LWD service, however, will depend on scope of the measurements available to the operator, the data density and the data accuracy. In addition, real-time data acquisition systems can be used to process data, images and other information and reduce the risks associated with real-time geosteering. See e.g., Wheeler et al., *The Introduction of an At-Bit Natural Gamma Ray Imagining Tool Reduces Risk Associated with Real-Time Geosteering Decisions in Coalbed Methane Horizontal Wells*, SPWLA 53$^{rd}$ Annual Logging Symposium, Jun. 16-20, 2012, page 1 through page 6, incorporated herein by reference. These real-time data acquisition systems typically provide information and data to instantly predict problems and make informed decisions, which leads to optimal performance, lower costs, and fewer risks. In short, real-time-enabled systems and methods help get the drilling right on the first time.

On the other hand, the processing of the data and information may be done by a downhole processor to give corrected measurements substantially in real-time. In addition, implicit in the control and processing of the data is the use of a computer and/or computer programs on a suitable machine readable medium that enables the processor or computer to perform the control and processing. The machine readable medium may include ROMs, EPROMs, EEPROMs, Flash Memories and Optical disks. Such media may also be used to store data and other information.

Furthermore, the methods and systems described herein are suitable for use in diverse and challenged environments including unconventional shale plays, and carbonate and elastic reservoirs. The present methods and systems enable enhanced formation evaluation, optimal placement of horizontal wells and identification of fractures and faults for optimization of completion design. After drilling, operators can interpret natural fracture network, model the reservoir structure and determine how the well could be optimally segmented during completion.

We claim:

1. A method of elemental imaging of a formation comprising:
   acquiring a spectral natural gamma ray measurement using a first detector, wherein the spectral natural gamma ray measurement includes natural gamma ray counts for each of a plurality of energy levels as a function of measured depth;
   acquiring a total natural gamma ray image using a second detector, wherein the total natural gamma ray image includes a total number of natural gamma rays detected in each of a plurality of azimuthal sectors as a function of measured depth;

deriving structure information of the formation for each said azimuthal sector from the total natural gamma ray image; and applying the structure information to the spectral natural gamma ray measurement to form an elemental image.

2. The method of claim 1, wherein said deriving structure information comprises comparing the total natural gamma ray image to a derived total natural gamma ray log, wherein the total natural gamma ray log includes a total number of natural gamma rays detected as a function of measured depth.

3. The method of claim 2, wherein the derived total natural gamma ray log is acquired from the total natural gamma ray image by summing over all of the azimuthal sectors at each measured depth or from the spectral gamma ray measurement by summing over all of the energy levels at each measured depth.

4. The method of claim 2, wherein deriving structure information of the formation comprises computing a shift in measured depth for each of the plurality of azimuthal sectors in the total natural gamma ray image relative to the derived total natural gamma ray log to obtain a depth shift map.

5. The method of claim 4, wherein applying the structure information comprises applying the depth-shift map to the spectral gamma ray measurement to construct an image for at least one of the plurality of energy levels in the spectral natural gamma ray measurement.

6. The method of claim 2, wherein:
said deriving structure information further comprises deriving a 2-D alpha filter from the total natural gamma ray image and the derived total natural gamma ray log; and
applying the 2-D alpha filter to the spectral natural gamma ray measurement to form the elemental image.

7. The method of claim 6, wherein the 2-D alpha filter is a pixel by pixel ratio of the total natural gamma ray image and a reconstructed total natural gamma ray image obtained from the derived total natural gamma ray log.

8. The method of claim 2, wherein:
said deriving structure information further comprises calculating an adjusted measured depth in the derived total natural gamma ray log for each of a plurality of pixels in the total natural gamma ray image; and
said applying the structure information comprises replacing a total natural gamma ray value of each of the plurality of pixels in the total natural gamma ray image by the spectral natural gamma ray measurement made at the same measured depth to generate the elemental images.

9. The method of claim 2, wherein deriving structure information comprises deriving a dip angle from the total natural gamma ray image.

10. The method of claim 9, wherein said deriving structure information further comprises calculating an adjusted measured depth in the derived total natural gamma ray log for each of a plurality of pixels in the total natural gamma ray image.

11. The method of claim 10, wherein said applying the structure information comprises replacing a total natural gamma value of each of said plurality of pixels in the total natural gamma ray image by the spectral natural gamma measurements made at the same adjusted measured depth to build the elemental images.

12. The method of claim 2, wherein:
said deriving structure information comprises generating a strata model of the formation with dipping; and
said applying the structure information comprises (i) generating a strata model of the formation potassium, uranium, and thorium natural gamma ray counts without dipping from the spectral natural gamma ray measurement, (ii) combining the strata model of the formation with dipping and the strata model of the formation potassium, uranium, and thorium natural gamma ray counts without dipping to generate a strata model of the formation potassium, uranium, and thorium natural gamma ray counts with dipping, and (iii) deriving an elemental image by forward modeling.

13. The method of claim 1, wherein the spectral natural gamma ray measurement comprises natural gamma ray counts for each of formation potassium, uranium, or thorium.

14. A method of elemental imaging of a formation comprising:
acquiring a spectral natural gamma ray measurement using a first detector, wherein the spectral natural gamma ray measurement includes natural gamma ray counts of potassium, uranium, and thorium as a function of measured depth;
acquiring a total natural gamma ray image using a second detector, wherein the total natural gamma ray image includes a total number of natural gamma rays detected in each of a plurality of azimuthal sectors as a function of measured depth;
deriving a total natural gamma ray log from the total natural gamma ray image or the spectral natural gamma ray measurement, wherein the total natural gamma ray log includes a total number of natural gamma rays detected as a function of measured depth;
computing a shift in measured depth for each of a plurality of azimuthal sectors in the total natural gamma ray image relative to the derived total natural gamma ray log to obtain a depth shift map; and
applying the depth shift map to the spectral natural gamma ray measurement to construct an image of the natural gamma ray counts of potassium, uranium, and thorium in the spectral natural gamma ray measurement.

15. A system for producing elemental images, the system comprising:
a spectral gamma ray tool including a first natural gamma ray sensor, wherein the spectral gamma ray tool is configured to cause the first sensor to acquire a spectral natural gamma ray measurement including natural gamma ray counts of energy levels corresponding to potassium, uranium, and thorium in a subterranean formation as a function of measured depth to acquire a spectral gamma ray measurement;
an azimuthal gamma ray imaging tool including a second natural gamma ray sensor, wherein the azimuthal gamma ray imaging tool is configured to cause the second sensor to acquire a total natural gamma ray image including a total number of natural gamma rays detected in each of a plurality of azimuthal sectors as a function of measured depth; and
a processor configured to: (i) derive structure information of the formation from the total natural gamma ray image for each said azimuthal sector and (ii) apply the structure information to the spectral natural gamma ray measurement to form an elemental image.

16. The system of claim 15, wherein the processor is deployed in one of the spectral gamma ray tool or the azimuthal gamma ray imaging tool.

* * * * *